US008595185B2

(12) United States Patent
Hayardeny et al.

(10) Patent No.: US 8,595,185 B2
(45) Date of Patent: *Nov. 26, 2013

(54) STORAGE DISASTER RECOVERY USING A PREDICTED SUPERSET OF UNHARDENED PRIMARY DATA

(75) Inventors: Amiram Hayardeny, Binyamina (IL); Martin Tross, Haifa (IL); Aviad Zlotnick, Galil Takhton (IL)

(73) Assignee: International Business Machines Corporation, Armonk, NY (US)

( * ) Notice: Subject to any disclaimer, the term of this patent is extended or adjusted under 35 U.S.C. 154(b) by 2553 days.

This patent is subject to a terminal disclaimer.

(21) Appl. No.: 10/673,733

(22) Filed: Sep. 29, 2003

(65) Prior Publication Data

US 2005/0081089 A1    Apr. 14, 2005

(51) Int. Cl.
*G06F 7/00* (2006.01)
*G06F 17/00* (2006.01)

(52) U.S. Cl.
USPC ........................... 707/613; 707/610; 707/609

(58) Field of Classification Search
USPC .......... 714/6, 16, 20; 707/202, 613, 610, 609; 710/31; 711/162
See application file for complete search history.

(56) References Cited

U.S. PATENT DOCUMENTS

| 5,657,440 | A | * | 8/1997 | Micka et al. | 714/16 |
| 5,720,029 | A | * | 2/1998 | Kern et al. | 714/20 |
| 5,742,792 | A | * | 4/1998 | Yanai et al. | 711/162 |
| 6,148,412 | A | * | 11/2000 | Cannon et al. | 714/6 |
| 6,269,431 | B1 | * | 7/2001 | Dunham | 711/162 |
| 6,377,960 | B1 | * | 4/2002 | Qiu et al. | 707/203 |
| 6,397,229 | B1 | * | 5/2002 | Menon et al. | 707/204 |
| 6,978,324 | B1 | * | 12/2005 | Black | 710/31 |
| 7,035,881 | B2 | * | 4/2006 | Tummala et al. | 707/204 |
| 2004/0193658 | A1 | * | 9/2004 | Kawamura et al. | 707/202 |
| 2004/0267836 | A1 | * | 12/2004 | Armangau et al. | 707/203 |

OTHER PUBLICATIONS

Fienblit, S., et al., "Asynchronous Data Mirroring with Look-Ahead Synchronization Record", U.S. Appl. No. 10/673,529, filed Sep. 23, 2003, pp. 1-38.
Tross, M., et al., "Low-Cost Remote Data Mirroring", U.S. Appl. No. 10/673,744, filed Sep. 29, 2003, pp. 1-43.
Ji, Minwen, et al. "Seneca: remote mirroring done write", Proceedings of USENIX Technical Conference, San Antonio, TX, pp. 253-268, Jun. 2003.

* cited by examiner

*Primary Examiner* — Usmaan Saeed
*Assistant Examiner* — Paul Kim
(74) *Attorney, Agent, or Firm* — Daniel Kligler (57) ABSTRACT

A method for managing a data storage system includes maintaining a record on a secondary storage subsystem, which is predictive of locations to which data are to be written on a primary storage subsystem by a host processor. Upon receiving at the primary storage subsystem, from a host processor, the data to be written to a specified location, if the specified location is not included in the record, the primary storage subsystem sends to the secondary storage subsystem so as to cause the secondary storage subsystem to update the record. The primary storage subsystem signals the host processor that the data have been stored in the data storage system responsively to receiving the data and to receiving an acknowledgment from the secondary storage subsystem indicating that the record has been updated.

19 Claims, 4 Drawing Sheets

STORAGE DISASTER RECOVERY USING A PREDICTED SUPERSET OF UNHARDENED PRIMARY DATA

CROSS-REFERENCE TO RELATED APPLICATION

This application is related to a U.S. patent application filed on even date, entitled "Asynchronous Data Mirroring with Look-Ahead Synchronization Record" 10/673,529, whose disclosure is incorporated herein by reference.

FIELD OF THE INVENTION

The present invention relates generally to data storage systems, and specifically to data mirroring for failure protection in storage systems.

BACKGROUND OF THE INVENTION

Data backup is a standard part of all large-scale computer data storage systems (and most small systems, as well). Data written to a primary storage medium, such as a volume on a local storage subsystem, are copied, or "mirrored," to a backup medium, typically another volume on a remote storage subsystem. The backup volume can then be used for recovery in case a disaster causes the data on the primary medium to be lost. Methods of remote data mirroring are surveyed by Ji et al., in an article entitled "Seneca: Remote Mirroring Done Write," *Proceedings of USENIX Technical Conference* (San Antonio, Tex., June, 2003), pages 253-268, which is incorporated herein by reference. The authors note that design choices for remote mirroring must attempt to satisfy the competing goals of keeping copies as closely synchronized as possible, while delaying foreground writes by host processors to the local storage subsystem as little as possible.

Large-scale storage systems, such as the IBM Enterprise Storage Server (ESS) (IBM Corporation, Armonk, N.Y.), typically offer a number of different copy service functions that can be used for remote mirroring. Among these functions is peer-to-peer remote copy (PPRC), in which a mirror copy of a source volume on a primary storage subsystem is created on a secondary storage subsystem. When an application on a host processor writes to a PPRC volume on the primary subsystem, the corresponding data updates are entered into cache memory and non-volatile storage at the primary subsystem. The control unit (CU) of the primary subsystem then sends the updates over a communication link to the secondary subsystem. When the CU of the secondary subsystem has placed the data in its own cache and non-volatile storage, it acknowledges receipt of the data. The primary subsystem then signals the application that the write operation is complete.

PPRC provides host applications with essentially complete security against single-point failures, since all data are written synchronously to non-volatile media in both the primary and secondary storage subsystems. On the other hand, the need to save all data in non-volatile storage on both subsystems before the host write operation is considered complete can introduce substantial latency into host write operations. In some large-scale storage systems, such as the above-mentioned IBM ESS, this latency is reduced by initially writing data both to cache and to high-speed, non-volatile media, such as non-volatile random access memory (RAM), in both the primary and secondary subsystems. The data are subsequently copied to disk asynchronously (an operation that is also referred to as "hardening" the data) and removed from the non-volatile memory. The large amount of non-volatile memory that must be used for this purpose is very costly.

Data mirroring functions are commonly classified as either "synchronous" or "asynchronous." In synchronous mirroring, all updates (data write operations) are propagated immediately to the secondary subsystem. This is generally the safest mode of operation, but also the slowest, since host writes are not acknowledged until the data have been stored in non-volatile media on both the primary and secondary subsystems. When asynchronous mirroring is used, on the other hand, hosts receive notification from the primary subsystem that a write is complete as soon as the data have been placed in the cache on the primary subsystem (or possibly after the data have been secured in non-volatile storage on the primary subsystem). The updates of the data are read out from the cache and sent to the secondary subsystem in a separate, background operation. The asynchronous approach gives better performance, in terms of response time to host writes, but is vulnerable to partial data loss in the case of failure.

SUMMARY OF THE INVENTION

The present invention provides methods for data mirroring that can be used to create storage systems that are immune to single-point failures, have low-latency write response, and permit rapid recovery after failure, without requiring special non-volatile memory or other costly components.

In embodiments of the present invention, a storage system comprises primary and secondary storage subsystems, which are configured to back up data from the primary to the secondary subsystem over a communication link in an asynchronous mirroring process, whereby the data are ultimately stored in non-volatile media on both the primary and secondary subsystems. The mirroring process is controlled using a metadata record, held on the secondary subsystem, which identifies storage locations that may be "out of sync" (i.e., may contain different data) on the primary and secondary subsystems. The metadata record is maintained in such a way that the locations identified in this record constitute a predictive superset of the locations that are actually out of sync. Typically, the primary subsystem is aware of the contents of this record, as well.

When a host writes data to a specified location on the primary subsystem, the primary subsystem places the data in its cache memory. If the specified location is already included in the metadata record (i.e., the record indicates that the location may be out of sync), the primary subsystem signals the host immediately to indicate that the write operation has been completed. Otherwise, if the specified location is not listed in the metadata record, the primary subsystem sends a message to the secondary subsystem, which causes the secondary subsystem to update the record synchronously. This message may include the actual data to be copied from the primary to the secondary subsystem. The primary subsystem in this case signals the host that the write operation has been completed when the primary subsystem receives an acknowledgment of this message from the secondary subsystem. In either case, the primary system acknowledges the write to the host without waiting for the data to be actually written to the disk (or other non-volatile media) on either the primary or secondary subsystem. The latency of write operations is thus held to a minimum. Because only a fraction of the host write operations (generally a small fraction) cause the primary system to send synchronous messages to the secondary subsystem, the added burden of communication traffic on the communication link between the subsystems is small.

Upon recovery from a failure on the primary subsystem, the secondary subsystem uses the metadata record to determine the locations from which it should copy data back to the primary subsystem in order to ensure that the two subsystems are fully synchronized. Because the metadata record is predictive, it may include some locations that are actually in sync, and will therefore be copied back unnecessarily. By judicious maintenance of the metadata record, as described hereinbelow, the amount of unnecessary copying can be limited, so that the primary subsystem recovers rapidly. The size of the predicted superset may be controlled so as to achieve the desired balance between write latency (which becomes shorter as the predictive superset is enlarged) and recovery time (which becomes shorter as the superset is reduced).

There is therefore provided, in accordance with an embodiment of the present invention, a method for managing a data storage system that includes primary and secondary storage subsystems, including respective first and second non-volatile storage media, the method including:

maintaining a record on the secondary storage subsystem, which is predictive of locations to which data are to be written on the primary storage subsystem by a host processor;

receiving at the primary storage subsystem, from the host processor, the data to be written to a specified location on the first non-volatile storage media;

if the specified location is not included in the record, sending a message from the primary storage subsystem to the secondary storage subsystem so as to cause the secondary storage subsystem to update the record;

signaling the host processor that the data have been stored in the data storage system responsively to receiving the data and, if the specified location was not included in the record, responsively to receiving an acknowledgment at the primary storage subsystem from the secondary storage subsystem indicating that the record has been updated; and storing the data in the specified location on both the first and second non-volatile storage media.

In some embodiments, sending the message includes copying the data synchronously from the primary storage subsystem to the secondary storage subsystem. Typically, storing the data includes, if the specified location is included in the record, copying the data from the primary storage subsystem to the secondary storage subsystem asynchronously, without updating the record with respect to the specified location. In a disclosed embodiment, copying the data includes transmitting the data between mutually-remote sites over a communication link between the sites. Additionally or alternatively, signaling the host processor includes, if the specified location is included in the record, indicating to the host processor that the data have been stored without waiting to receive the acknowledgment from the secondary storage subsystem.

Typically, copying the data includes creating a mirror on the secondary storage subsystem of the data received by the primary storage subsystem. In one embodiment, the method includes, upon occurrence of a failure in the primary storage subsystem, configuring the secondary storage subsystem to serve as the primary storage subsystem so as to receive further data from the host processor to be stored by the data storage system. Additionally or alternatively, the method includes, upon recovery of the system from a failure of the primary storage subsystem, conveying, responsively to the record, a portion of the data from the secondary storage subsystem to the primary storage subsystem for storage on the primary storage subsystem.

In a disclosed embodiment, maintaining and updating the record include marking respective bits in a bitmap corresponding to the locations to which the data are to be written on the first and second non-volatile storage media.

Typically, maintaining the record includes maintaining a copy of the record on the primary storage subsystem, and sending the message includes deciding at the primary storage subsystem to send the message responsively to the copy of the record. Sending the message typically includes modifying both the record and the copy of the record responsively to the specified location. In a disclosed embodiment, modifying both the record and the copy of the record includes adding a plurality of locations, including the specified location, to both the record and the copy of the record.

Additionally or alternatively, maintaining the copy of the record includes selecting one or more locations, other than the specified location, to be removed from the record, and instructing the secondary storage subsystem to remove the one or more locations from the record, so as to limit a size of the record. Typically, storing the data includes copying the data to be stored in the one or more locations from the primary storage subsystem to the secondary storage subsystem, and selecting the one or more locations includes receiving a return message from the secondary storage subsystem indicating that the secondary storage subsystem has received the copied data, and selecting the one or more locations to be removed from the record responsively to the return message.

Further additionally or alternatively, selecting the one or more locations includes identifying the locations at which the first and second non-volatile storage media contain substantially identical data, and selecting for removal one of the identified locations that was least-recently added to the record.

In one embodiment, sending the message includes adding one or more entries to both the record and the copy of the record responsively to the specified location, and grouping the entries added to the copy of the record and the record in generations according to an order of adding the entries to the records, and selecting the one or more locations includes determining at the primary subsystem that all the entries in one of the generations may be removed from the record.

In another embodiment, instructing the secondary storage subsystem to remove the one or more locations includes appending an instruction to the message sent from the primary storage subsystem to the secondary storage subsystem.

In some embodiments, sending the message causes the secondary storage subsystem to predict one or more further locations to which the host processor is expected to write the data in a subsequent write operation, and to add the one or more further locations to the record. Typically, the one or more further locations include a predetermined number of consecutive locations in proximity to the specified location. Alternatively, maintaining the record includes recording the locations to which the data are written using an object-based storage technique, and the one or more further locations are chosen based on a logical connection between storage objects.

There is also provided, in accordance with an embodiment of the present invention, a data storage system, including:

a primary storage subsystem, which includes first non-volatile storage media; and a secondary storage subsystem, which includes second non-volatile storage media, and which is arranged to maintain a record that is predictive of locations to which data are to be written on the primary storage subsystem by a host processor, wherein the primary storage subsystem is arranged to receive the data from a host processor for writing to a specified location, and to store the data in the specified location on the first non-volatile storage media while copying the data to the second storage subsystem, which is arranged to store the data in the specified location on the second non-volatile storage media, and wherein the primary storage subsystem is further arranged, upon receiving from the host processor the data to be written to a specified location on the first non-volatile storage media, if the specified location is not included in the record, to send a message to the secondary storage subsystem so as to cause the secondary storage subsystem to update the record and to return an acknowledgment to the primary storage subsystem indicating that the record has been updated, and wherein the primary storage subsystem is further arranged to signal the host processor that the data have been stored in the data storage system responsively to receiving the data and, if the specified location was not included in the record, responsively to receiving the acknowledgment from the secondary storage subsystem.

There is additionally provided, in accordance with an embodiment of the present invention, a computer software product for use in a data storage system including primary and secondary storage subsystems, which include respective first and second control units and respective first and second non-volatile storage media, the product including a computer-readable medium in which program instructions are stored, which instructions, when read by the first and second control units, cause the first control unit to receive data from a host processor for writing to a specified location, and to store the data in the specified location on the first non-volatile storage media while copying the data to the second storage subsystem, and cause the second control unit to maintain a record that is predictive of locations to which the data are to be written on the primary storage subsystem by the host processor, and, to store the data copied to the second storage subsystem in the specified location on the second non-volatile storage media, wherein the instructions further cause the first control unit, if the specified location is not included in the record, to send a message to the secondary storage subsystem so as to cause the second control unit to update the record and to return an acknowledgment to the primary storage subsystem, and cause the first control unit to signal the host processor that the data have been stored in the data storage product responsively to receiving the data and, if the specified location was not included in the record, responsively to receiving the acknowledgment from the second control unit.

The present invention will be more fully understood from the following detailed description of the preferred embodiments thereof, taken together with the drawings in which:

DETAILED DESCRIPTION OF PREFERRED EMBODIMENTS

Figure 1:
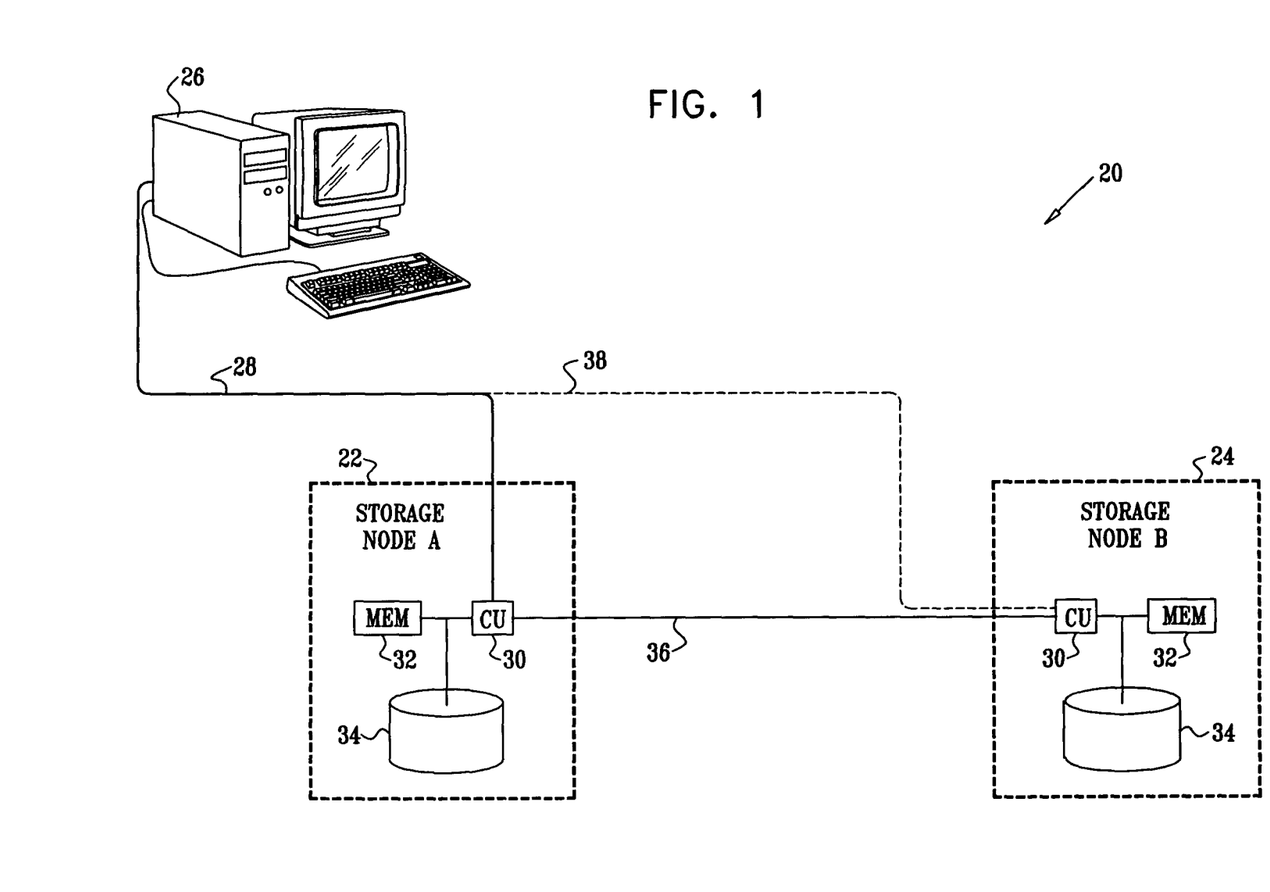
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises storage subsystems 22 and 24, which are labeled "storage node A" and "storage node B" for convenience. In the description that follows, it is assumed that node A is configured as the primary storage subsystem, while node B is configured as the secondary storage subsystem for purposes of data mirroring. Thus, to write and read data to and from system 20, a host computer 26 (referred to alternatively simply as a "host") communicates over a communication link 28 with subsystem 22. Typically, link 28 is part of a computer network, such as a storage area network (SAN). Alternatively, host 26 may communicate with subsystem 22 over substantially any suitable type of serial or parallel communication link. Although for the sake of simplicity, only a single host is shown in FIG. 1, system 20 may serve multiple hosts. Typically, in normal operation, hosts may write data only to primary storage subsystem 22, but may read data from either subsystem 22 or 24.

Subsystems 22 and 24 may comprise substantially any suitable type of storage device known in the art, such as a storage server, SAN disk device or network-attached storage (NAS) device. Subsystems 22 and 24 may even comprise computer workstations, which are configured and programmed to carry out the storage functions described herein. Subsystems 22 and 24 may be collocated in a single facility or, for enhanced data security, they may be located at mutually-remote sites. Although system 20 is shown in FIG. 1 as comprising only a single primary storage subsystem and a single secondary storage subsystem, the principles of the present invention may be applied in a straightforward manner to systems having greater numbers of primary and/or secondary storage subsystems. For example, the methods described hereinbelow may be extended to a system in which data written to a primary storage subsystem are mirrored on two different secondary storage subsystems in order to protect against simultaneous failures at two different points.

Each of subsystems 22 and 24 comprises a control unit (CU) 30, typically comprising one or more microprocessors, with a cache 32 and non-volatile storage media 34. Typically, cache 32 comprises volatile random-access memory (RAM), while storage media 34 comprise a magnetic disk or disk array. Alternatively, other types of volatile and non-volatile media, as are known in the art, may be used to carry out the cache and storage functions of subsystems 22 and 24. The term "non-volatile storage media," as used in the context of the present patent application and in the claims, should therefore be understood to comprise collectively any and all of the non-volatile media that are available in a given storage subsystem, while "cache" or "volatile memory" comprises any and all of the volatile media. Control units 30 typically carry out the operations described herein under the control of software, which may be downloaded to subsystems 22 and 24 in electronic form, over a network, for example, or may be provided, alternatively or additionally, on tangible media, such as CD-ROM.

Subsystems 22 and 24 communicate between themselves over a high-speed communication link 36, which may be part of a SAN or other network, or may alternatively be a dedicated line between the two subsystems. Alternatively, control unit 30 and cache 32 of subsystem 24 may be collocated with subsystem 22, while storage media 34 of subsystem 24 are remotely located, as described in a U.S. patent application entitled, "Low-Cost Remote Data Mirroring" Ser. No. 10/673,744, filed on even date, whose disclosure is incorporated herein by reference.

Subsystem 24 may also be coupled to communicate with host 26, as well as with other hosts (not shown), over a communication link 38, similar to link 28. Link 38 enables subsystem 24 to serve as the primary storage subsystem in the event of a failure in subsystem 22. (In this case, some data may be lost. To ensure data consistency notwithstanding the data loss, the subsystems may be synchronized from time to time, and a concurrent copy—a "snapshot"—may be made of the stored data, as is known in the art. A bitmap may then be used to record changes since the last concurrent copy was made, and to update the data when switching back and forth between the primary and secondary subsystems after failure and subsequent recovery.) It will be thus be observed that the capabilities of the primary and secondary storage subsystems are substantially identical, and the functional designations "primary" and "secondary" are arbitrary and interchangeable. Optionally, subsystem 22 may serve as the primary subsystem for some hosts, while subsystem 24 serves as the primary subsystem for others, at the same time as it serves as the secondary subsystem for backup of subsystem 22. In this latter case, subsystem 22 may serve as the secondary subsystem for backup of subsystem 24.

In the embodiments described below, it is assumed that system 20 is configured for asynchronous data mirroring. In other words, upon receiving data from host 26 to be written to subsystem 22, control unit 30 writes the data to cache 32, and then signals the host to acknowledge the write operation without necessarily waiting for the data to be copied to secondary subsystem 24. Control unit 30 stores the data from cache 32 to its local storage media 34 and transmits the data over link 36 to subsystem 24 for mirror (backup) storage by means of background processes. After receiving the data, or possibly after storing the data at the appropriate locations on its own storage media 34, control unit 30 of subsystem 24 sends an acknowledgment back to subsystem 22. The data storage and mirroring operations on subsystem 24 are thus carried out asynchronously and independently of the completion of the write operation between host 26 and subsystem 22.

Figure 2:
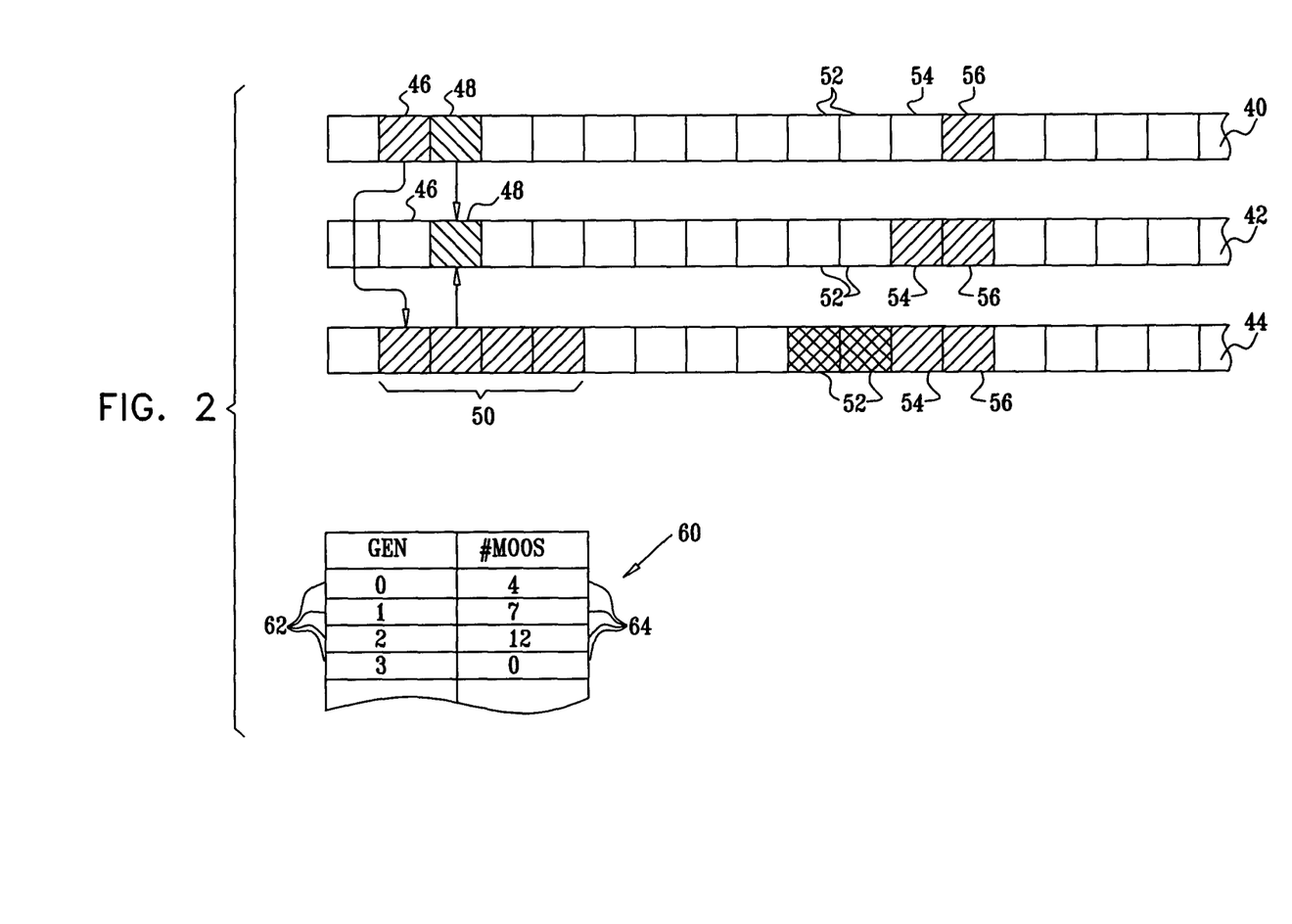
FIG. 2 is a schematic representation of data structures used in tracking data storage, in accordance with an embodiment of the present invention.

FIG. 2 is a schematic representation of data structures that are maintained on subsystem 22 for tracking data storage in system 20, in accordance with an embodiment of the present invention. Bitmaps 40, 42 and 44 are metadata records, which are typically held in volatile memory, such as cache 32, on subsystem 22. The bitmaps are used in recording the locations at which the data on storage media 34 in subsystems 22 and 24 are or may be out of sync. Each bit represents a different location. Typically, when storage media 34 comprise disks, each bit in the bitmaps corresponds to a disk track, but the bits (and the corresponding locations) may alternatively correspond to different sorts of data elements, of finer or coarser granularity. Furthermore, although the bitmaps described here are a convenient means for maintaining metadata records, other types of data structures may similarly be used for the purposes of the present invention, as will be apparent to those skilled in the art.

The specific purposes of the bitmaps shown in FIG. 2 are as follows:

Bitmap 40 indicates "dirty" locations in cache 32 on subsystem 22. The marked locations in bitmap 40 correspond to tracks on storage media 34 in subsystem 22 to which host 26 has written data, which are currently being held in cache 32 and have not yet been hardened to the storage media. Control unit 30 of subsystem 22 clears the bits in bitmap 40 when it hardens the corresponding data, indicating that the cache is now clean with respect to these locations.

Bitmap 42 indicates locations at which the data held by subsystem 22 (in cache 32 or storage media 34) are out of sync with the corresponding locations in the cache or storage media in subsystem 24. When control unit 30 of subsystem 22 signals host 26 to acknowledge a write operation to a specified track before having sent the data over link 36 to subsystem 24, the control unit sets the bit corresponding to this track in bitmap 42. The control unit then sends the data to subsystem 24, and clears the bit when it receives an acknowledgment from subsystem 24 that the data have been received there. Bitmap 42 is therefore referred to as the "out-of-sync" (OOS) bitmap. Clearly, if subsystem 22 fails and then subsequently recovers, any locations marked by bits that were set in bitmap 42 at the time of failure must be copied back from subsystem 24 to subsystem 22 in order to synchronize storage media 34 on the two subsystems.

Bitmap 44 contains a predictive superset of the bits set in bitmap 42, indicating both locations that are known to be out of sync with subsystem 24 and locations that are not currently out of sync, but to which host 26 is expected to write in the near future. A corresponding bitmap is held on subsystem 24, and is referred to as the "maybe-out-of-sync" (MOOS) bitmap. All bits that are set in bitmap 44 are also set by control unit 30 of secondary subsystem 24 in the MOOS bitmap held on the secondary subsystem. Therefore, bitmap 44 is essentially a copy of the MOOS bitmap, and is referred to as the "marked-on-secondary" (MOS) bitmap.

In some embodiments, control unit 30 on subsystem 22 may use a generation table 60 to keep track of the bits that are set and cleared in bitmap 44. The use of the generation table is also described in detail hereinbelow.

Upon recovery of subsystem 22 from a failure, control unit 30 in subsystem 24 reads its own copy of the MOOS bitmap in order to determine the tracks that are to be copied back to subsystem 22 from subsystem 24. Subsystem 24 then transmits back the contents of these tracks, along with any other tracks that changed on subsystem 24 while subsystem 22 was out of service (if, for example, subsystem 24 was used as the primary storage subsystem during the failure and received additional write operations from host 26). During normal operation, the bits to be set in bitmap 44 are selected using a predetermined, predictive method, as described hereinbelow. The same method is used to set the bits in the MOOS bitmap on subsystem 24, thus ensuring that the bits set in the MOOS bitmap on subsystem 24 will always be a well-defined superset of the bits that are set in OOS bitmap 42 on subsystem 22, and substantially identical to the bits that are set in MOS bitmap 44 on subsystem 22, while limiting the frequency with which subsystem 22 must instruct subsystem 24 to update the MOOS bitmap.

Control unit 30 of subsystem 22 may maintain an additional record (typically another bitmap, not shown in the figures) for use in recovery from failures of subsystem 24. This record indicates the tracks of data that subsystem 22 has copied to subsystem 24 over link 36, but which may not yet have been hardened to non-volatile storage media 34 on subsystem 24. In the event of a failure in subsystem 24, this record indicates which data will have to be copied back from subsystem 22 to subsystem 24 during recovery (in addition to any new data that may have been written to subsystem 22 during the period of the failure). From time to time, during normal operation, control unit 30 of subsystem 24 informs subsystem 22 of the tracks that have been hardened on subsystem 24, whereupon the control unit of subsystem 22 removes these tracks from its record. Thus, upon recovery from a failure of subsystem 22, the amount of data that must be copied back to subsystem 24 is limited to the tracks listed in the record maintained by subsystem 22, so that the time needed for full recovery is not too long. The use of this sort of bitmap for failure recovery is described in detail in the above-mentioned U.S. patent application entitled "Low-Cost Remote Data Mirroring" Ser. No. 10/673,744.

Control unit 30 of subsystem 24 may maintain a similar additional record, indicating the tracks of data that have been copies from subsystem 22 to subsystem 24, but which may not yet have been hardened on subsystem 22. In this case, upon recovery from a failure in subsystem 22, the control unit of subsystem 24 will copy back to subsystem 22 the tracks of data that are marked in a union of this additional record with the MOOS bitmap on subsystem 24 (together with any other tracks on subsystem 24 in which the data has changed during the failure of subsystem 22, if subsystem 24 accepted host writes during this period, for example).

Figure 3:
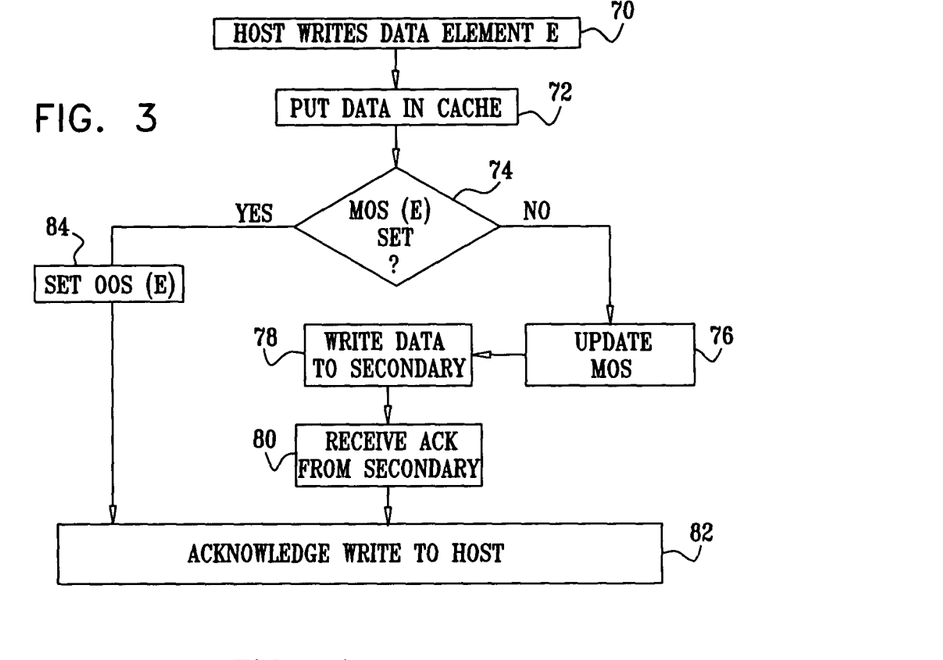
FIG. 3 is a flow chart that schematically illustrates a method for tracking data storage, in accordance with an embodiment of the present invention.

FIG. 3 is a flow chart that schematically illustrates a method for tracking data storage on system 20, in accordance with an embodiment of the present invention. The method uses bitmaps 40, 42 and 44, as shown in FIG. 2, and is described with reference to these bitmaps. Control unit 30 of subsystem 22 initiates the method whenever host 26 writes data to a specified location on subsystem 22, at a host writing step 70. The location is denoted here as "track E." Control unit 30 places the data in its cache 32, and sets a bit 46 in bitmap 40 to indicate that track E is "dirty" in cache 32, at a data caching step 72. The control unit hardens the data from cache 32 to storage media 34, as noted above, in a process that take place in background, asynchronously with the host write operation and metadata manipulations that are described here. When subsystem 22 has hardened the data stored in the track corresponding to bit 46, control unit 30 clears the bit in bitmap 40.

After setting bit 46 in bitmap 40, control unit 30 checks bitmap 44 to determine whether the corresponding bit, referred to as MOS(E), is set in bitmap 44, at a MOS checking step 74. If MOS(E) is not set in bitmap 44, control unit 30 updates bitmap 44, at a MOS update step 76. Typically, when the control unit updates the bitmap, it sets not only MOS(E) (corresponding to bit 46), but rather a group of bits 50, corresponding to tracks to which host 26 is predicted to direct its subsequent write operations. Any suitable prediction algorithm may be used to select bits 50. For example, bits 50 may comprise E and the next N bits (in the present example, N=3) in bitmap 44 following MOS(E), as shown in FIG. 2. Control unit 30 may also clear certain bits in bitmap 44 at this stage, as described below with reference to FIG. 4.

After updating bitmap 44, control unit 30 of subsystem 22 transmits a message containing the data that are to be written to track E over link 36 to subsystem 24, at a secondary writing step 78. Alternatively, the message may simply indicate that track E has received write data, and the control unit may send the actual data asynchronously. In this latter case, the control unit also sets the corresponding bit in bitmap 42, referred to as OOS(E), at this step. (When the message sent at step 78 contains the data, it is not necessary to set OOS(E) at this point.)

Upon receiving the data, control unit 30 of subsystem 24 places the data in its local cache 32 and updates its MOOS bitmap. In one embodiment, the control unit of subsystem 24 updates the MOOS bitmap autonomously. In this case, the control unit of subsystem 24 checks the MOOS bitmap to determine whether the bit corresponding to track E is set. If the bit is not set, the control unit sets a group of bits using the same prediction algorithm as was used in subsystem 22 at step 76. Thus, in the present example, bits 50 will be set in the MOOS bitmap on subsystem 24, as well. This embodiment has the advantage of minimizing communication traffic on link 36.

In an alternative embodiment, the message sent by control unit 30 of subsystem 22 at step 78 explicitly instructs the control unit of subsystem 24 to set the appropriate bits in the MOOS bitmap on subsystem 24. The message may also instruct the control unit of subsystem 24 to clear certain bits, as described below.

Control unit 30 of subsystem 24 then returns a write acknowledgment (ACK), which is received by subsystem 22 at a secondary acknowledgment step 80. Upon receiving this acknowledgment, control unit 30 of subsystem 22 signals its own write acknowledgment to host 26, at a host acknowledgment step 82, and the host write operation is done.

On the other hand, if control unit 30 in subsystem 22 finds at step 74 that MOS(E) is set, it does not update bitmap 44. Rather, the control unit sets the corresponding bit in bitmap 42, referred to as OOS(E), in an OOS setting step 84. For example, after writing to the track corresponding to bit 46, host 26 may continue writing to the next track, which corresponds to a bit 48 in bitmap 40. Because of the prediction carried out at the previous pass through step 76, the corresponding bit (one of bits 50) is already set in bitmap 44. Thus, the control unit sets OOS(E), and then signals acknowledgment to host 26 immediately at step 82, as described above. In this case, no further operations are required on the MOS and MOOS bitmaps at this stage, and the host write operation is completed by subsystem 22 without requiring any synchronous communication with subsystem 24. Synchronous communication is required only when MOS(E) is not set prior to receiving the host write at step 70.

As host 26 continues to write data to system 20, more new bits will continue to be set in MOS bitmap 44 and in the MOOS bitmap on subsystem 24 on successive iterations through steps 76 and 78. The greater the number of bits that are set in bitmap 44, while the corresponding tracks on subsystems 22 and 24 are not actually out of sync, the larger the number of tracks that will be unnecessarily copied from subsystem 24 to subsystem 22 during recovery from failure. In order to limit the number of tracks that are copied unnecessarily, a number of different methods may be used, singly or in combination, to clear bits in the MOS and MOOS bitmaps when the corresponding tracks are known to be in sync:

Secondary-initiated clearing—When subsystem 24 receives data to be stored in a given track in the course of the normal asynchronous copy function that is used to back up data that have been written to subsystem 22, control unit 30 of subsystem 24 clears the corresponding bit in its MOOS bitmap and sends an acknowledgment back to subsystem 22. The control unit of subsystem 22 then clears the corresponding bit in its own MOS bitmap 44.

Explicit clearing by primary—When control unit 30 of subsystem 22 explicitly instructs subsystem 24 to set the certain bits in the MOOS bitmap (typically at step 78, as described above), the control unit may also instruct subsystem 24 to clear certain bits. An exemplary method for choosing the bits to be cleared is described hereinbelow with reference to FIG. 4. Explicit clearing may also be used when the control unit of subsystem 24 updates the MOOS bitmap autonomously.

Generation clearing by primary—Control unit 30 of subsystem 22 may use generation table 60 (FIG. 2) to keep track of the bits that have been set in MOS bitmap 44. The table shown in the figure comprises generation numbers 62, and for each generation, a bit counter 64 indicating the number of bits in this generation that are set in bitmap 44. When control unit 30 in subsystem 22 sets bits in bitmap 44 at step 76, it also increments counter 64 for the current generation, until the counter reaches a preset maximum. The control unit then goes on to the next generation. Control unit 30 in subsystem 24 uses the same sort of generation counter, with the same maximum counter value, so that each bit that is set in the MOS and MOOS bitmaps belongs to the same generation on both subsystems. The control units may keep track of the locations of the bits that are set in each generation, by means of further entries (not shown) in table 60, for example, or by a separate listing of bits per generation, or by entering generation values or timestamps in the MOS and MOOS bitmaps (in which case they are no longer simply bitmaps, but rather comprises a more complex metadata record).

When control unit 30 in subsystem 22 determines that a given bit in MOS bitmap 44 can be cleared, it decrements counter 44 for the generation to which the bit belongs. When the counter value reaches zero, the control unit instructs subsystem 24 to clear the entire generation in the MOOS bitmap, and then clears the generation in the MOS bitmap, as well. Use of this method for maintaining the MOS and MOOS bitmaps is described in further detail hereinbelow with reference to FIG. 5.

Figure 4:
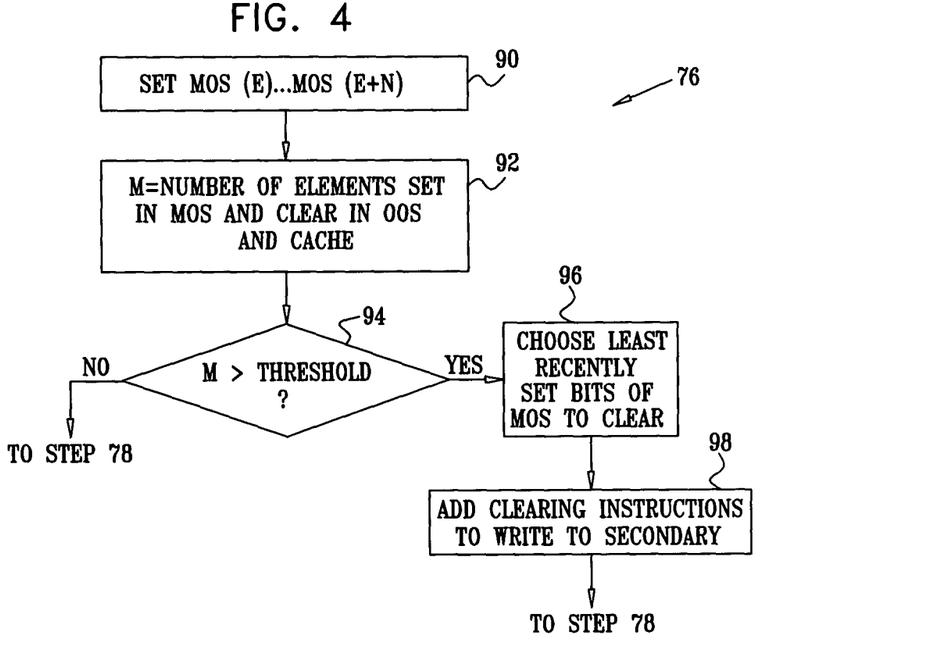
FIGS. 4 and 5 are flow charts that schematically illustrate methods for maintaining a predictive metadata record, in accordance with an embodiment of the present invention.

FIG. 4 is a flow chart that schematically shows details of MOS update step 76, in accordance with an embodiment of the present invention. As noted above, when control unit 30 at subsystem 22 determines at step 74 that MOS(E) is not set, the control unit sets MOS(E), and also predicts the next tracks to which host 26 is likely to write and sets the corresponding bits in bitmap 44, at a prediction step 90. In the present example, the control unit sets bits MOS(E) through MOS(E+N). The number of predicted bits to set, N, is chosen so as to strike the desired balance between low average latency (achieved when N is large) and rapid failure recovery (achieved when N is small, since in this case a relatively smaller number of tracks will be copied back from subsystem 24 to subsystem 22 during recovery).

Alternatively, other methods may be used to choose the bits that are to be set in bitmap 44 at step 90. For example, a certain number of bits prior to bit E may be set, in addition to or instead of the bits following E. As another example, control unit 30 may employ object-based storage techniques to track the storage locations that are out of sync and to predict the locations to which host 26 is likely to write next. In object-based storage, the control unit is aware of the association between storage locations and logical objects. Thus, at step 90, control unit 30 may use logical connections between the logical objects to determine which bits to set in MOS bitmap 44. For instance, if the logical objects are pages written in Hypertext Markup Language (HTML), the control unit may, upon receiving data to be written to a first HTML page, set bits in bitmap 44 corresponding to other HTML pages to which the first page has hyperlinks. As noted above, whatever method is used by control unit 30 in subsystem 22, the same method is used by the control unit in subsystem 24 to update its own MOOS bitmap when it receives data sent from subsystem 22 at step 78.

As noted above, in order to limit the number of tracks that are copied unnecessarily, control unit 30 may choose certain tracks to be cleared in bitmap 44, at a bitmap checking step 92. The tracks whose bits may be cleared in bitmap 44 are generally those for which the corresponding bits in both of bitmaps 40 and 42 are clear. These tracks are "clean" in cache 32 and are in sync with subsystem 24, meaning that the data stored in these tracks of non-volatile media 34 of subsystems 22 and 24 are substantially identical.

Referring back to FIG. 2, for example, bits 52, 54 and 56 are set in bitmap 44. Bit 56 is also set in bitmaps 40 and 42, and bit 54 is set in bitmap 40. Bits 52, however, are clear in bitmaps 40 and 42, possibly because these bits were set in bitmap 44 at an earlier pass through step 90, based on a prediction (which has gone unrealized) that host 26 would write to these bits. Therefore, the tracks corresponding to bits 52 are known to contain identical data on non-volatile media 34 of subsystems 22 and 24, and these bits may be cleared.

Control unit 30 on subsystem 22 counts the total number, M, of the unnecessarily-set bits in bitmap 44, such as bits 52, and compares this number to a predetermined threshold, at a bitmap evaluation step 94 (FIG. 4). As long as M is below the threshold, there is no need to clear any of the bits in bitmap 44 at this step. The threshold is chosen so as to give the desired balance between low write latency (high threshold) and rapid failure recovery (low threshold). If M is above the threshold, control unit 30 in subsystem 22 chooses some of the unnecessarily-set bits in bitmap 44 to be cleared, at a bit selection step 96, so that the number of unnecessarily-set bits remaining after this step will be less than the threshold. As noted above, the bits to be cleared in MOS bitmap 44 and in the MOOS bitmap are selected at this step from among those that are clear in bitmaps 40 and 42, such as bits 52.

Typically, control unit 30 on subsystem 22 keeps a list or other record of the respective times at which the bits in bitmap 42 were set, and chooses at step 96 to clear the unnecessarily-set bits that were set least recently. For example, generation table 60 (FIG. 2) may be used for this purpose. In order to find bits to clear in bitmap 44, the control unit begins with the oldest generation for which counter 64 is non-zero, and determines whether any of the bits that were set in bitmap 44 in this oldest generation are clear in bitmaps 40 and 42. If so, the control unit selects one or more of these bits in bitmap 44. (In the present example, the counter for generation 0, the oldest generation, indicates that four bits are set in bitmap 44 in this generation.) If the control unit does not find a sufficient number of bits to clear in the oldest generation, it moves on to the next generation. Upon clearing the bits, the control unit decrements the appropriate generation counter 64 accordingly. Alternatively, other metadata records and/or other criteria may be used to choose the bits to clear at this step.

Having selected the bits to be cleared at step 96, control unit 30 of subsystem 22 prepares instructions to send to subsystem 24, instructing the control unit of subsystem 24 to clear the corresponding bits in the MOOS bitmap, at a secondary instruction step 98. These instructions are appended to the message that is to be transmitted to subsystem 24 at step 78. Upon receiving the acknowledgment from subsystem 24 at step 80, the control unit of subsystem 22 clears these same bits in its own MOS bitmap 44. Alternatively, for reduction of communication overhead on link 36, control unit 30 of subsystem 22 may simply decrement generation counter 64 for the generation to which the bits selected at step 96 belong. In this case, the control unit waits to send the bit clearing instructions to subsystem 24 until the counter value has dropped to zero, whereupon the instructions apply to the entire generation.

Figure 5:
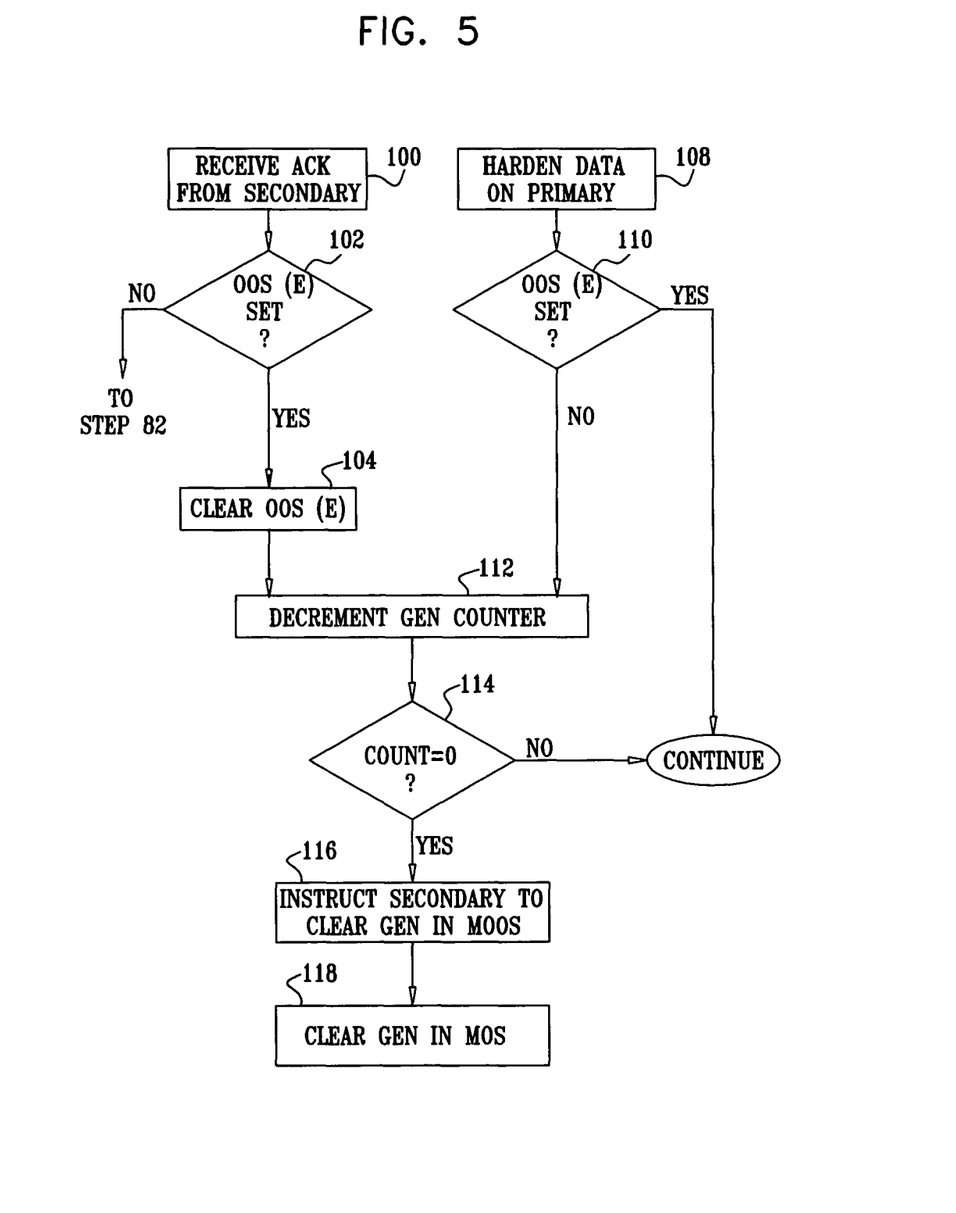

FIG. 5 is a flow chart that schematically illustrates a method for maintaining bitmap 44 on subsystem 22 and the maintaining the corresponding MOOS bitmap on subsystem 24, in accordance with an embodiment of the present invention. This method is carried out mainly as a background process, asynchronously with the host write process shown in FIG. 3. It is used by control unit 30 of subsystem 22 in conjunction with the background processes that are employed to harden data from cache 32 to non-volatile media 34 in subsystem 22 and to copy data from subsystem 22 to subsystem 24.

The method of FIG. 5 may be invoked when control unit 30 of subsystem 22 receives a message over link 36 from subsystem 24 acknowledging receipt of data copied over link 36 to a certain track—track E—on subsystem 24, at an acknowledgment step 100. The data copy operation may have been a synchronous write, performed at step 78 (FIG. 3) when the control unit determined that MOS(E) in bitmap 44 was clear at step 74. In this case, the corresponding bit in bitmap 42, OOS(E), will be clear when the acknowledgment is received from subsystem 24 (assuming that the data to be copied were written to subsystem 24 at step 78, as noted above). In the example shown in FIG. 2 and described above, bit 46 is clear in bitmap 42 for this reason. Therefore, upon receiving the acknowledgment, control unit 30 of subsystem 22 checks whether OOS(E) is set in bitmap 42, at a first OOS checking step 102. If so, the acknowledgment received at step 100 is the acknowledgment referred to in step 80 in the method of FIG. 3, and the control unit proceeds to acknowledge the host write operation at step 82, without further change to bitmap 44 at this point.

On the other hand, if OOS(E) is found to be set at step 102, control unit 30 of subsystem 22 clears OOS(E) in bitmap 42, at an OOS clearing step 104. The control unit also marks the corresponding bit, MOS(E), in bitmap 44, as a bit that may be cleared in the MOS and MOOS bitmaps. Control unit 30 determines the generation to which this bit belongs, and decrements the corresponding generation counter 64 in table 60 (FIG. 2), at a counter decrementation step 112.

The method of FIG. 5 may also be invoked when control unit 30 finishes hardening a track of data on non-volatile media 34 of subsystem 22, at a hardening step 108. In this case, the control unit also checks whether the corresponding track is still out of sync with subsystem 24, i.e., whether OOS(E) is set in bitmap 42, at a second OOS checking step 110. If OOS(E) is set, control unit 30 on subsystem 22 takes no further action with respect to bitmap 44 at this point. On the other hand, if OOS(E) is found to be clear at step 110, the control unit marks MOS(E) in bitmap 44, as described above, since this track is known to be hardened and synchronized, and decrements the corresponding generation counter at step 112.

Control unit 30 of subsystem 22 checks to determine whether the value of generation counter 64 has now dropped to zero, at a counter checking step 114. The counter may drop to zero either as a result of the process shown here in FIG. 5, or as a result of choosing bits to be cleared in bitmap 44 in order to reduce the number of unfulfilled predictions at step 96, as described above with reference to FIG. 4. In either case, when counter 64 has dropped to zero, control unit 30 of subsystem 22 sends a message to subsystem 24 instructing subsystem 24 to clear all the bits in the corresponding generation in its own MOOS bitmap, at a generation instruction step 116. As noted above, because both of subsystems 22 and 24 use the same prediction algorithm for setting bits in the MOS and MOOS bitmaps, and have the same number of predictions in each generation, the same bits will be set in each generation of the bitmaps on both subsystems. The command instructing subsystem 24 to clear a given generation may be sent as a separate message, or it may be appended to the next data message sent at step 78. Upon receiving an acknowledgment of the generation clearing command from subsystem 24, control unit 30 of subsystem 22 clears the same generation in its own MOS bitmap 44.

As noted above, other methods may be used for maintaining synchronization between the MOOS records on subsystems 22 and 24. For example, control unit of subsystem 22 may append to every write message that it sends at step 78 (or at least to some of the messages) an explicit list of bits to be set and cleared in the MOOS bitmap of subsystem 24. Other data structures and messaging methods for this purpose will be apparent to those skilled in the art.

As was further noted above, the designations "primary" and "secondary" applied to subsystems 22 and 24 are arbitrary. The principles of the present invention can be applied to symmetrical configurations, in which subsystem 22 serves as the primary subsystem for some hosts, while subsystem 24 serves as the primary subsystem for others. In this case, each of subsystems 22 and 24 serves as the secondary subsystem for the other (primary) subsystem, and both subsystems carry out both the primary and secondary sides of the methods described hereinabove.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for managing a data storage system that includes primary and secondary storage subsystems, including respective first and second non-volatile storage media, the method comprising:

maintaining a record on the secondary storage subsystem, which is predictive of locations to which data are to be written on the primary storage subsystem by a host processor, the record including a designation of locations to which the host is expected to write in the near future;

receiving at the primary storage subsystem, from the host processor, the data to be written to a specified location on the first non-volatile storage media;

making a determination that the specified location is not included in the record, and responsively to the determination sending a message from the primary storage subsystem to the secondary storage subsystem so as to cause the secondary storage subsystem to update the record, wherein sending the message causes the secondary storage subsystem to predict one or more further locations to which the host processor has not yet written the data and is expected to write the data in a subsequent write operation, and to set a number of predicted locations in the record corresponding to the one or more further locations;

signaling the host processor that the data have been stored in the data storage system responsively to receiving the data and, upon having made the determination that the specified location was not included in the record, responsively to receiving an acknowledgment at the primary storage subsystem from the secondary storage subsystem indicating that the record has been updated; and storing the data in the specified location on both the first and second non-volatile storage media.

2. The method according to claim 1, wherein sending the message comprises copying the data synchronously from the primary storage subsystem to the secondary storage subsystem.

3. The method according to claim 2, wherein storing the data comprises, upon making the determination that the specified location is included in the record, copying the data from the primary storage subsystem to the secondary storage subsystem asynchronously, without updating the record with respect to the specified location.

4. The method according to claim 3, wherein copying the data comprises transmitting the data between mutually-remote sites over a communication link between the sites.

5. The method according to claim 3, wherein maintaining the record comprises maintaining a copy of the record on the primary storage subsystem, and wherein signaling the host processor comprises, upon making the determination that the specified location is included in the record, indicating to the host processor that the data have been stored without waiting to receive the acknowledgment from the secondary storage subsystem.

6. The method according to claim 1, wherein copying the data comprises creating a mirror on the secondary storage subsystem of the data received by the primary storage subsystem.

7. The method according to claim 6, and comprising, upon occurrence of a failure in the primary storage subsystem, configuring the secondary storage subsystem to serve as the primary storage subsystem so as to receive further data from the host processor to be stored by the data storage system.

8. The method according to claim 6, and comprising, upon recovery of the system from a failure of the primary storage subsystem, conveying, responsively to the record, a portion of the data from the secondary storage subsystem to the primary storage subsystem for storage on the primary storage subsystem.

9. The method according to claim 1, wherein maintaining and updating the record comprise marking respective bits in a bitmap corresponding to the locations to which the data are to be written on the first and second non-volatile storage media.

10. A method for managing a data storage system that includes primary and secondary storage subsystems, including respective first and second non-volatile storage media, the method comprising:
maintaining a record on the secondary storage subsystem, which is predictive of locations to which data are to be written on the primary storage subsystem by a host processor, wherein maintaining the record comprises maintaining a copy of the record on the primary storage subsystem;
receiving at the primary storage subsystem, from the host processor, the data to be written to a specified location on the first non-volatile storage media;
making a determination that the specified location is not included in the record, and responsively to the determination sending a message from the primary storage subsystem to the secondary storage subsystem so as to cause the secondary storage subsystem to update the record, wherein sending the message comprises deciding at the primary storage subsystem to send the message responsively to the copy of the record, and
wherein sending the message causes the secondary storage subsystem to predict one or more further locations to which the host processor has not yet written the data and is expected to write the data in a subsequent write operation, and to set a number of predicted locations in the record corresponding to the one or more further locations;
signaling the host processor that the data have been stored in the data storage system responsively to receiving the data and, upon having made the determination that the specified location was not included in the record, responsively to receiving an acknowledgment at the primary storage subsystem from the secondary storage subsystem indicating that the record has been updated; and
storing the data in the specified location on both the first and second non-volatile storage media.

11. The method according to claim 10, wherein sending the message comprises modifying both the record and the copy of the record responsively to the specified location.

12. The method according to claim 11, wherein modifying both the record and the copy of the record comprises adding a plurality of locations, including the specified location, to both the record and the copy of the record.

13. The method according to claim 10, wherein maintaining the copy of the record comprises selecting one or more locations, other than the specified location, to be removed from the record, and instructing the secondary storage subsystem to remove the one or more locations from the record, so as to limit a size of the record.

14. The method according to claim 13, wherein storing the data comprises copying the data to be stored in the one or more locations from the primary storage subsystem to the secondary storage subsystem, and wherein selecting the one or more locations comprises receiving a return message from the secondary storage subsystem indicating that the secondary storage subsystem has received the copied data, and selecting the one or more locations to be removed from the record responsively to the return message.

15. The method according to claim 13, wherein selecting the one or more locations comprises identifying the locations at which the first and second non-volatile storage media contain substantially identical data, and selecting for removal one of the identified locations that was least-recently added to the record.

16. The method according to claim 13, wherein sending the message comprises adding one or more entries to both the record and the copy of the record responsively to the specified location, and grouping the entries added to the copy of the record and the record in generations according to an order of adding the entries to the records, and wherein selecting the one or more locations comprises determining at the primary subsystem that all the entries in one of the generations may be removed from the record.

17. The method according to claim 13, wherein instructing the secondary storage subsystem to remove the one or more locations comprises appending an instruction to the message sent from the primary storage subsystem to the secondary storage subsystem.

18. The method according to claim 1, wherein the one or more further locations comprise a predetermined number of consecutive locations in proximity to the specified location.

19. The method according to claim 1, wherein maintaining the record comprises recording the locations to which the data are written using an object-based storage technique, and wherein the one or more further locations are chosen based on a logical connection between storage objects.

* * * * *